(No Model.)

G. DUNCAN.
BRAKE FOR CABLE RAILWAY CARS.

No. 295,238. Patented Mar. 18, 1884.

Witnesses
H. H. Hanscom
P. H. Campbell

Inventor
George Duncan

UNITED STATES PATENT OFFICE.

GEORGE DUNCAN, OF DUNEDIN, OTAGO, NEW ZEALAND.

BRAKE FOR CABLE-RAILWAY CARS.

SPECIFICATION forming part of Letters Patent No. 295,228, dated March 18, 1884.

Application filed December 22, 1883. (No model.)

*To all whom it may concern:*

Be it known that I, GEORGE DUNCAN, a subject of Great Britain, residing at Dunedin, Otago, New Zealand, have invented a new and useful Improvement in Brakes for Cable-Railway Cars, of which the following is a specification.

My invention relates to that class of brakes which act upon a part of the permanent way, instead of the wheels, of a car, and are more especially necessary where steep grades are encountered in a climate where snow and ice accumulate on the rails, preventing frictional contact between the rails and the wheels of the car.

The object of this invention is attained by a wedge and mechanism for operating it in connection with the irons forming the slot of the tube, in which an endless cable is used for propelling the cars, and the invention is illustrated in the accompanying drawings, in which—

Figure 1:
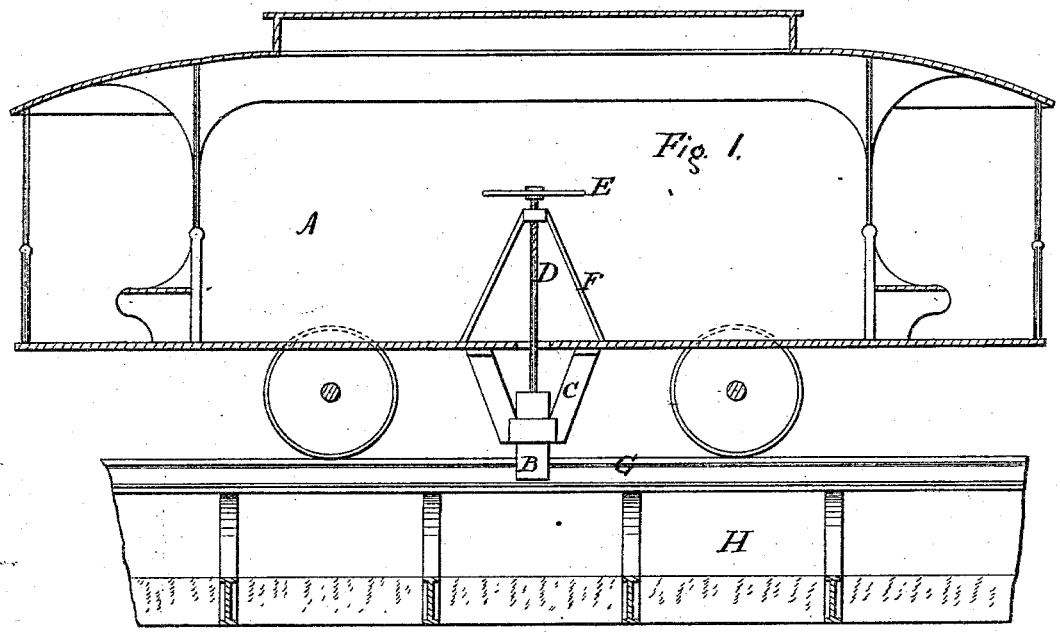
Figure 2:
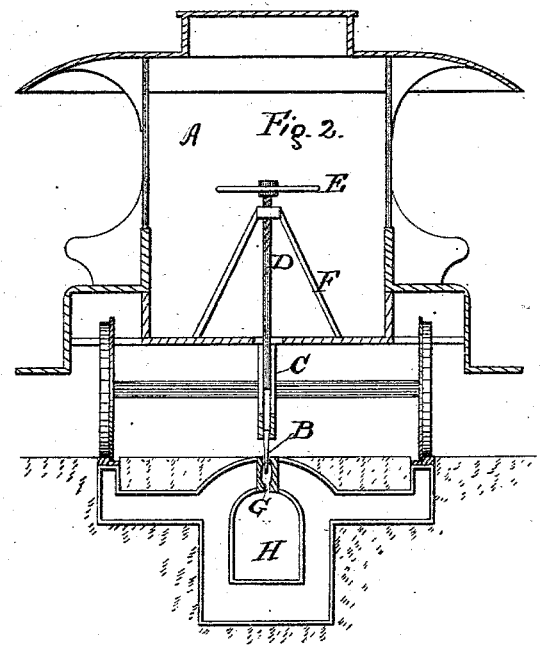

Figure 1 is a longitudinal sectional elevation of a cable-railway tube, H, with its slot-irons G, and car A, having a wedge, B, guided in a suitable frame, C, projecting downwardly from the car, so that the wedge shall be supported near the slot-irons when in action, and which allows of a vertical movement of the wedge to any desired degree by means of the hand-wheel E and screw D, which are supported by the stand F, having a nut at the top, through which the screw D passes, the screw being attached to the upper part of the wedge by a joint, which allows a free rotation of the screw. Fig. 2 is a cross-section of the tube H and car A, the letters in the two figures indicating like parts.

The wedge B in this case, with its guide and mechanism for operating, is shown in the center of the car; but it is obvious that it may be placed at any other point on the car in line with the slot that may be desired or that conditions may require; and it may be operated by a lever instead of a screw, but I prefer a screw, as the adjustment of the wedge in the slot when acting as a brake may be made with greater nicety.

The operation is simple and as follows: When it is desired to stop the car or partially arrest its motion, the hand-wheel E is revolved, which carries the screw D downward, and with it the wedge B, which, entering the slot, is forced into contact with the irons G of the slot, and the resultant friction arrests the motion of the car to any degree required.

The angle of the wedge is made to suit the car, the grade of the road, and other requirements.

What I claim as my invention, and desire to secure by Letters Patent, is—

1. The combination of the wedge B, guide C, screw D, hand-wheel E, and stand F, with the car A and the slot-irons G of an underground slotted-tube endless-cable railway, substantially as shown and described.

2. The combination of the wedge B, guide C, stand F, screw D, and hand-wheel E, with the car A.

3. The wedge B and guide C, in combination with the car A and slot-irons G.

4. In an endless-cable underground slotted-tube railway, the combination of a car, A, a wedge, B, and the slot-irons G of the tube, substantially as shown and described, and for the purpose set forth.

GEORGE DUNCAN.

Witnesses:
W. W. HANSCOM,
P. H. CAMPBELL.